(No Model.)
F. W. SCHLEPEGRELL.
ELECTRICAL SPEED INDICATOR.
No. 380,824. Patented Apr. 10, 1888.
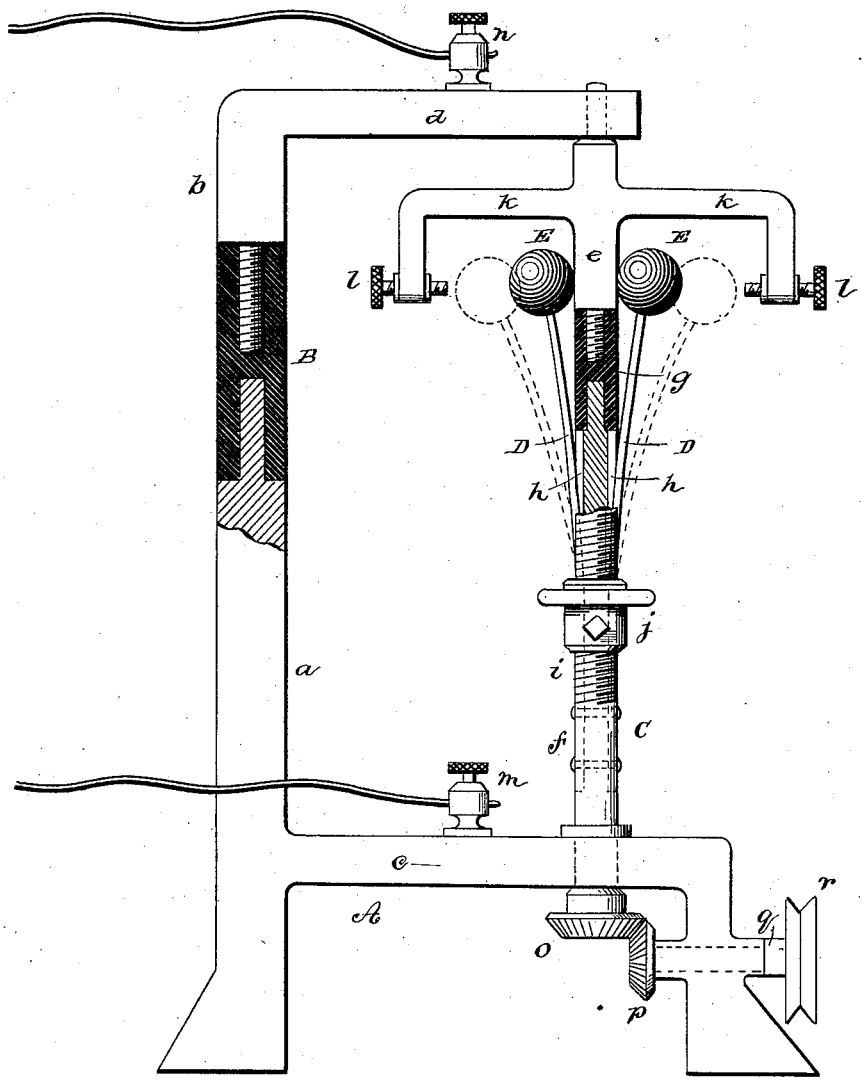
WITNESSES:
INVENTOR:
F. W. Schlepegrell
BY Munn & Co.
ATTORNEYS.

United States Patent Office.

FREDERICK W. SCHLEPEGRELL, OF CHARLESTON, SOUTH CAROLINA.

ELECTRICAL SPEED-INDICATOR.

SPECIFICATION forming part of Letters Patent No. 380,824, dated April 10, 1888.

Application filed June 21, 1887. Serial No. 242,014. (No model.)

*To all whom it may concern:*

Be it known that I, FREDERICK W. SCHLEPEGRELL, of Charleston, in the county of Charleston and State of South Carolina, have invented a new and Improved Electrical Speed-Indicator, of which the following is a specification, reference being had to the accompanying drawing, which is a side elevation, partly in section, of my improved electrical speed-indicator.

The object of my invention is to provide a simple and efficient instrument by which the increase or diminution of speed in machinery above or below its normal rate may be indicated electrically.

My invention consists in the construction and arrangement of parts hereinafter fully described and claimed.

The frame A of the speed-indicator is formed of two principal parts, $a$ $b$, the two parts being connected by an insulating threaded sleeve, B, into which the upper and lower parts of the frame are screwed. In the horizontal arm $c$ of the lower part of the frame and horizontal arm $d$ of the upper part of the frame is journaled the indicator-shaft C, which is formed of two parts, $e f$, connected together by an insulating-sleeve, $g$.

In grooves $h$, on opposite sides of the lower part, $f$, of the shaft C, are secured flat springs D, and to the threaded portion $i$ of the shaft C is fitted a nut, $j$, which may be moved up or down upon the shaft to vary the length of the free ends of the said springs D. To the extremity of each spring D is secured a weight, E, preferably of spherical form. The upper part, $e$, of the shaft C is provided with arms $k$, extending in opposite directions from the shaft, turned downward at their extremities and provided with contact-screws $l$, which are supported opposite the paths of the weights E.

The binding-post $m$ is secured to the lower part of the frame A, and the binding-post $n$ is secured to the upper part of the said frame. The current entering the frame through the binding-posts can pass from one part of the frame to the other only when the weights E touch the upper part of the shaft or when they come into contact with the contact-screws $l$.

The shaft C is arranged to receive motion in any convenient way. In the present case I have shown a bevel-wheel, $o$, attached to the end of the said shaft, and a bevel-pinion, $p$, attached to a counter-shaft, $q$, and adapted to engage the bevel-wheel $o$, and the said counter-shaft $q$ is provided with a pulley, $r$, which is driven by a belt from any suitable part of the machine whose speed is to be indicated.

The weights E are adjusted relative to the motion of the shaft C, when driven by a machine in the manner described, so that when the machine runs at its normal speed the weights E will occupy a position between the upper part, $e$, of the shaft C and the contact-screws $l$, as indicated in dotted lines, and the circuit will remain open so long as the machine with which the indicator is connected continues to run at its normal speed; but when the speed increases the weights E touch the contact-screws $l$ and complete the circuit, and the binding-posts $m$ $n$, being connected with a battery and electric bell or other alarm, a signal is given indicating that the speed of the machine has changed. A like effect is produced when the machine runs slower than its normal speed, or when it stops, as the weights E will be brought into contact with the part $e$ of the shaft C, thus completing the circuit.

The machine may be adjusted to adapt it to higher or lower speeds by turning the nut $j$ up or down upon the lower portion of the shaft C, thus shortening or lengthening the springs; also by turning the contact-springs $l$ in or out.

Having thus fully described my invention, I claim as new and desire to secure by Letters Patent—

1. In an electric speed-indicator, the combination, with the frame A, consisting of the two parts $a$ $b$, insulated from each other and having parallel arms $c$ $d$, respectively, provided with binding-posts, of a shaft journaled between said arms $c$ $d$, and formed of insulated sections, the upper section, $e$, of which has horizontal angular arms, and the governor-arms provided at their free ends with balls or weights operating between the section $e$ and the ends of its horizontal arms, substantially as set forth.

2. In an electric speed-indicator, the shaft C, formed of insulated sections, horizontal angular arms on the section $e$, provided with contact-screws $l\ l$, projecting toward the shaft, and the governor-arms secured to the lower section and having balls or weights at their free ends normally resting against the section $e$, in line with the contact-screws, substantially as set forth.

3. In a speed-indicator, the combination, with the shaft C, formed of the externally-threaded part $f$, the part $e$, provided with the arms $k$, the insulation $g$, connecting the parts $f\ e$, the contact-screws $l$, the springs D, and the nut $j$, substantially as described.

FREDERICK W. SCHLEPEGRELL.

Witnesses:
FRANK M. SHIRER,
C. I. SCHLEPEGRELL.